(12) United States Patent
Kritt et al.

(10) Patent No.: US 8,843,483 B2
(45) Date of Patent: Sep. 23, 2014

(54) METHOD AND SYSTEM FOR INTERACTIVE SEARCH RESULT FILTER

(75) Inventors: Barry A. Kritt, Raleigh, NC (US);
Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/482,715

(22) Filed: May 29, 2012

(65) Prior Publication Data

US 2013/0325840 A1    Dec. 5, 2013

(51) Int. Cl.
*G06F 17/30* (2006.01)
*G06F 15/16* (2006.01)

(52) U.S. Cl.
USPC .......................................... 707/732; 707/752

(58) Field of Classification Search
None
See application file for complete search history.

(56) References Cited

U.S. PATENT DOCUMENTS

| | | | |
|---|---|---|---|
| 6,012,053 A | 1/2000 | Pant et al. | |
| 6,028,605 A | 2/2000 | Conrad et al. | |
| 6,944,612 B2 | 9/2005 | Roustant et al. | |
| 7,725,422 B2 | 5/2010 | Ryan et al. | |
| 7,809,710 B2 | 10/2010 | Galai et al. | |
| 7,899,833 B2 | 3/2011 | Stevens et al. | |
| 7,953,593 B2 | 5/2011 | Marchisio et al. | |
| 8,010,904 B2 | 8/2011 | Prabhu | |
| 8,037,041 B2 | 10/2011 | Gupta | |
| 2004/0177015 A1 | 9/2004 | Galai et al. | |
| 2006/0224587 A1 | 10/2006 | Zamir et al. | |
| 2008/0104542 A1* | 5/2008 | Cohen et al. | 715/810 |
| 2008/0235608 A1* | 9/2008 | Prabhu | 715/765 |
| 2008/0270451 A1 | 10/2008 | Thomsen et al. | |
| 2009/0119288 A1 | 5/2009 | Sagoo et al. | |
| 2009/0125482 A1 | 5/2009 | Peregrine et al. | |
| 2009/0164425 A1 | 6/2009 | Olston et al. | |
| 2009/0281994 A1 | 11/2009 | Byron | |
| 2009/0292681 A1 | 11/2009 | Wood et al. | |
| 2009/0327223 A1 | 12/2009 | Chakrabarti et al. | |
| 2010/0131491 A1 | 5/2010 | Lemaire et al. | |
| 2010/0185604 A1 | 7/2010 | Keohane et al. | |
| 2010/0268702 A1 | 10/2010 | Wissner et al. | |
| 2011/0119261 A1 | 5/2011 | Qiao | |
| 2011/0137832 A1 | 6/2011 | Weerasinghe | |
| 2011/0196875 A1 | 8/2011 | Vadlamani et al. | |
| 2013/0007587 A1* | 1/2013 | Marantz et al. | 715/234 |

OTHER PUBLICATIONS

Masunaga et al.; "SERPWatcher: A Sophisticated Mining Tool Utilizing Search Engine . . . Social Change Discovery", IEEE 2nd Inter. Conf. on, Aug. 20-22, 2010, pp. 465-472.

(Continued)

*Primary Examiner* — Alex Gofman
(74) *Attorney, Agent, or Firm* — Kunzler Law Group; Steven L. Bennett

(57) ABSTRACT

For filtering web search results, a method includes extracting metadata attributes and associated attribute values from web search results from a web search engine. The web search results organized into a results list with web page data grouped as an entry in the results list. The metadata attributes and associated attribute values extracted from the results list. The method includes presenting the extracted metadata attributes and receiving input from the user indicating one or more selected metadata attributes and a position indication for each selected metadata attribute. Each position indication indicates where in a custom report that attribute values for each selected metadata attribute are to appear. The method includes filtering the received results list based on the selected metadata attributes and displaying the filtered results list to the user in a custom report arranged by the selected position indication for each selected metadata attribute.

17 Claims, 7 Drawing Sheets

(56) References Cited

OTHER PUBLICATIONS

Marcialis et al.; "SEARCHY: An Agent to Personalized Search Results", ICIW IEEE 3rd International Conference on, Jun. 8-13, 2008, pp. 512-517.

IBM et al.; "Search Engines Providing Additional Search Results Based on Users Configuration", IPCOM000199904D, Sep. 21, 2010.
IBM et al.; "Metata Driven Report Parameter Screens", IPCOM000014927D, Aug. 1, 2001.
Mark Klinchin, "How to Use Sharepoint Metadata to Improve Search and Control Content", Metavis Technologies, Jan. 2010, pp. 1-19.

* cited by examiner

401 ↘
402

| Metadata Attribute |
|---|
| Size |
| Type |
| Date Created |
| Owner |
| Author |
| Title |
| Comments |
| Artist |
| Album Title |
| Year |
| Track Number |
| Genre ✱ |
| Duration |
| Bit Rate  426 |
| Protected |
| File Format |
| Camera Model |
| More ... |

412 410 411 410 411  414(typ)   408 409

| | | | Year | | | | | |
|---|---|---|---|---|---|---|---|---|
| Genre | Artist | 2007 | 2008 | 2009 | 2010 | 2011 | 2012 |
| R&B ✱ | | | | | | | |
| 424 | A1 | 2 | 2 | 0 | 4 | 7 | 4 |
| | A2 | 2 | 0 | 4 | 6 | 2 | 0 |
| | A3 | 1 | 5 | 0 | 9 | 2 | 7 |
| Blues | | | | | | | |
| | A4 | 6 | 4 | 0 | 4 | 0 | 6 |
| | A5 | 10 | 0 | 5 | 9 | 12 | 2 |
| | A6 | 0 | 0 | 0 | 9 | 13✱ | 8 |
| Hip-Hop | | | | | | | |
| | A7 | 0 | 5 | 7 | 5 | 10 | 12 |
| | A8 | 14 | 15 | 9 | 0 | 0 | 0 |
| Classical | | | | | | | |
| | A9 | 8 | 8 | 10 | 12 | 8 | 6 |
| | A10 | 9 | 8 | 0 | 5 | 6 | 5 |
| | A11 | 8 | 5 | 7 | 0 | 11 | 4 |

404  
406  
416 (typ)  418 (typ)  420 (typ)  422

FIG. 4B

METHOD AND SYSTEM FOR INTERACTIVE SEARCH RESULT FILTER

BACKGROUND

1. Field

The subject matter disclosed herein relates to web searching and more particularly relates to web search filtering.

2. Description of the Related Art

Web searches are currently used to search for web pages on a computer network, such as the Internet. Typically a user inputs search criteria, such as a phrase, a word, a combination of words, etc. into a web search engine. Searches may be conducted using a natural language style, a Boolean logic style, a pre-prepared search form, and the like. Web searches using a web search engine typically produce web search results in the form of a results list that include a large number of entries. Often a user may look at only first page of web search results or may only look at the few pages of web search results. Valuable entries in the results list may be missed by a user because the entries are scattered among a large number of entries in the results list.

BRIEF SUMMARY

A method for filtering web search results is disclosed. An apparatus and computer program product also perform the functions of the method. The method includes, in one embodiment, extracting metadata attributes and associated attribute values from web search results. The web search results are returned in response to a search request submitted by a user to a web search engine. The search request includes search criteria and the web search results include data extracted from web pages searched by the web search engine and meeting the search criteria. The web search results are organized into a results list where data from a web page is grouped as an entry in the results list. The metadata attributes and associated attribute values are extracted from the data of the results list. The method includes, in another embodiment, presenting the extracted metadata attributes to the user for the user to select one or more metadata attributes and receiving input from the user indicating one or more selected metadata attributes and a position indication for each selected metadata attribute. Each position indication indicates where in a custom report that attribute values for each selected metadata attribute are to appear.

The method, in another embodiment, includes filtering the received results list based on the selected metadata attributes and associated attribute values and displaying the filtered results list to the user in a custom report. The custom report is arranged by the selected position indication for each selected metadata attribute. For an attribute value of a selected metadata attribute, the custom report is organized based on the position information of the selected metadata attribute to display the attribute value, according to the position information, along with a display of a quantity of entries from the results list associated with the attribute value.

In one embodiment, each indication of a quantity of entries from the results list comprises a link to entries that have the attribute value associated with the display of the quantity of entries. In another embodiment, the position information received from the user is chosen so each display of a quantity of entries is associated with at least one attribute value from two or more selected metadata attributes. In a further embodiment, a plurality of quantities of entries are displayed in a table and each displayed quantity of entries is linked to entries from the results list that include two or more attribute values from one or more metadata attributes. In another embodiment, selected position information for a first selected metadata attribute includes displaying associated attribute values along a first axis of the table and selected position information for a second selected metadata attribute includes displaying associated attribute values along a second axis of the table. Quantity entries aligning with a first attribute value of the first selected metadata attribute and with a first attribute value of the second selected metadata attribute include entries with both the first attribute value of the first selected metadata attribute and with the first attribute value of the second selected metadata attribute.

In one embodiment, each displayed quantity of entries is linked to entries from the results list that include attributes values from two or more metadata attributes and each displayed quantity of entries is organized so it is apparent that a display of the included attribute values from the two or more metadata attributes are associated with the displayed quantity of entries. In another embodiment, the method includes receiving from the user a selection of a displayed quantity of entries and displaying entries associated with the selected quantity of entries. In another embodiment, the method includes displaying a metadata attribute selection mechanism in response to a display of entries of the results list and receiving from the user a selection of the metadata attribute selection mechanism. Extraction of the metadata attributes and associated attribute values is in response to receiving the selection of the metadata attribute selection mechanism from the user.

In a further embodiment, the metadata attribute selection mechanism comprises a button displayed along with the display of entries of the results list. In another embodiment, the web search results are first web search results and the method includes adding a recommendation to one or more of a quantity of entries from the results list, an attribute value, and a metadata attribute, where the recommendation may be words and/or a symbol that a user recognizes as a recommendation and the recommendation appears in second web search results in response to a second web search.

In one embodiment, the results list comprises links to web pages meeting the search criteria, each web page comprising one or more of informational web pages, videos, pictures, video games, and music. In another embodiment, presenting the metadata attributes to the user for the user to select a plurality of metadata attributes further comprises presenting a subset of metadata attributes to the user. In a further embodiment, the subset of metadata attributes displayed to the user are organized by number of times attribute values of each metadata attribute occurs in the results list and are organized so a metadata attribute with a largest number of attribute value occurrences is displayed first in the display of metadata attributes to the user.

In one embodiment, for each selected metadata attribute, displaying the filtered results list to the user in a custom report further includes displaying, for a selected metadata attribute, a subset of associated attribute values along with a display of associated quantities of entries from the results list. In a further embodiment, the subset of attribute values displayed to the user are organized by number of occurrences of attribute values and are organized so an attribute value with a largest number of occurrences is displayed first in the display of attribute values.

A computer program product for filtering search results may be included where the computer program product includes a computer readable storage medium having computer readable program code embodied therewith. The computer readable program code includes computer readable program code configured to include the method described above.

An apparatus for filtering search results includes a metadata extraction module, an attribute presentation module, a metadata attribute selection module, a filter module, and a report display module. The metadata extraction module extracts metadata attributes and associated attribute values from web search results. The web search results are returned in response to a search request submitted by a user to a web search engine. The search request includes search criteria and the web search results include data extracted from web pages searched by the web search engine and meeting the search criteria. The web search results are organized into a results list where data from a web page is grouped as an entry in the results list, the metadata attributes and associated attribute values extracted from the data of the results list.

The attribute presentation module presents the metadata attributes to the user for the user to select one or more metadata attributes. The metadata attribute selection module receives input from the user indicating one or more selected metadata attributes and a position indication for each selected metadata attribute. Each position indication indicates where in a custom report that attribute values for each selected metadata attribute are to appear. The filter module filters the received results list based on the selected metadata attributes and associated attribute values.

The report display module displays the filtered results list to the user in a custom report. The custom report is arranged by the selected position indication for each selected metadata attribute. For an attribute value of a selected metadata attribute, the custom report is organized based on the position information of the selected metadata attribute to display the attribute value, according to the position information, along with a display of a quantity of entries from the results list associated with the attribute value. At least a portion of each module may be logic hardware, computer readable program code, or both. The computer readable program code is stored on computer readable storage media.

In one embodiment, the apparatus includes a results selection module that receives from the user a selection of a displayed quantity of entries and a filtered results display module that displays entries associated with the selected quantity of entries. In another embodiment, the apparatus includes a metadata attribute mechanism module that displays a metadata attribute selection mechanism in response to a display of entries of the results list and a metadata attribute mechanism selection module that receives from the user a selection of the metadata attribute selection mechanism. Presenting the extracted metadata attributes to the user occurs prior to receiving the selection of the metadata attribute selection mechanism from the user. In another embodiment, the apparatus includes a server and the server executes the apparatus.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4B is a schematic block diagram of a display of one embodiment of a custom report using selected metadata attributes and associated attribute values extracted from web search results;

DETAILED DESCRIPTION OF THE INVENTION

Figure 1:
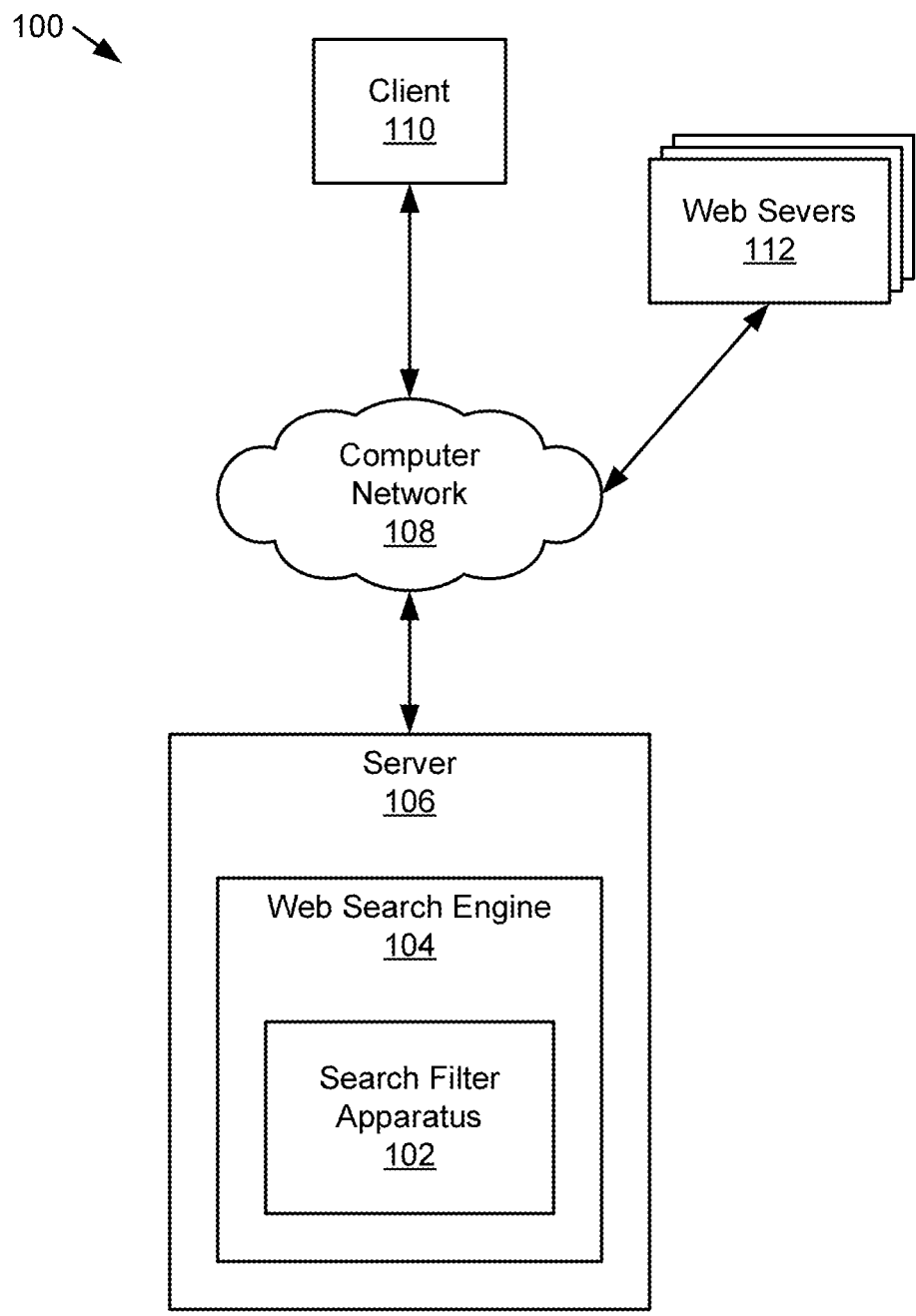
FIG. 1 is a schematic block diagram illustrating one embodiment of a system for web searching in accordance with the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented using various forms of logic hardware, such as a hardware circuit comprising custom VLSI circuits or gate arrays, off-the-shelf semiconductors such as logic chips, transistors, or other discrete components. A module may also be implemented as logic hardware in programmable hardware devices such as field programmable gate arrays, programmable array logic, programmable logic devices or the like.

Modules may also be implemented in software as computer readable program code for execution by various types of processors and modules may also be implemented using a combination of logic hardware and computer readable program code. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server.

The computer program product may be integrated into a client, server and network environment by providing for the computer program product to coexist with applications, operating systems and network operating systems software and then installing the computer program product on the clients and servers in the environment where the computer program product will function. In one embodiment, software is identified on clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for web searching in accordance with the present invention. The system 100 includes a search filter apparatus 102, a web search engine 104, a server, 106, a computer network 108, a client 110, and web servers 112, which are described below. The search filter apparatus 102 extracts metadata attributes from web search results and allows a user to select one or more of the metadata attributes so that associated attribute values can be placed in a custom report to filter the web search results. The search filter apparatus 102 is depicted as part of a web search engine 104, but all or part of the search filter apparatus 102 may be separate from the web search engine 104. For example, the search filter apparatus 102 may be an application that works separately from a web search engine 104.

The web search engine 104 and search filter apparatus 102 may be part of a server 106 as shown accessible by a client 110 through a computer network 108 or may be installed on or accessible by a computing device, such as a desktop computer, workstation, laptop computer, tablet computer, a mobile computing device such as a cellular phone or smartphone, or any other computing device with access to a computer network 108. The computing device may be a client 110 accessing the web search engine 104 and/or the search filter apparatus 102 by way of the server 106. In one embodiment, the computing device includes the search filter apparatus 102 and accesses a web search engine 104 located on the server 106. The server 106 may be part of a cloud computing environment accessible by the computing device. One of skill in the art will recognize other ways of implementing the search filter apparatus 102 and web search engine 104 for user access using a computing device.

The computer network 108 may be a single network or may include several computer networks 108 linked together. The computer network 108 may include a local area network ("LAN"), wide area network ("WAN"), wireless network, etc. The computer network 108 may include hardware such as the server 106, routers, switches, cabling, and other communication hardware. The computer network 108 may include the internet and access remote web servers 112 with web pages that satisfy search criteria for a web search. Web pages available to the web search engine 104 may be located within a proprietary computer network 108, such as within servers 106, web servers 112, etc. of a company or may be located external to a proprietary computer network 108 and may be available for public access. Web pages may include data, information, diagrams, photographs, music, files, or any other content available using a web search engine 104. One of skill in the art will recognize other content and web pages available for access by a web search engine 104 over one or more computer networks 108.

Figure 2:
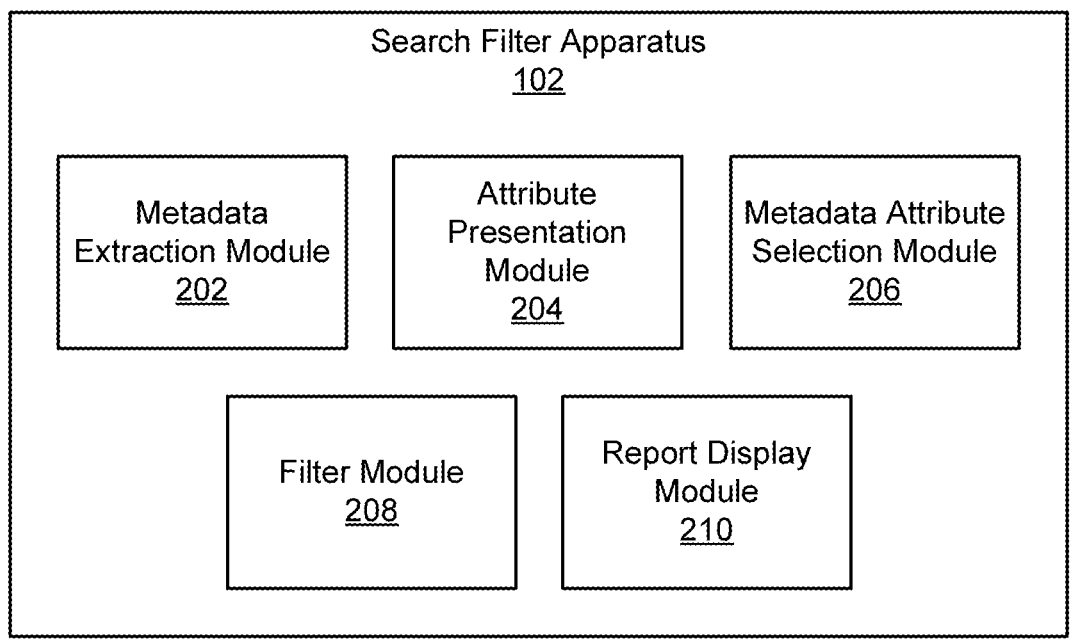
FIG. 2 is a schematic block diagram illustrating one embodiment of an apparatus for web searching in accordance with the present invention.

FIG. 2 is a schematic block diagram illustrating one embodiment of an apparatus 200 for web searching in accordance with the present invention. In one embodiment, the apparatus 200 includes the search filter apparatus 102 with a metadata extraction module 202, an attribute presentation module 204, a metadata attribute selection module 206, a filter module 208, and a report display module 210, which are described below.

In one embodiment, the search filter apparatus 102 includes a metadata extraction module 202 that extracts metadata attributes and associated attribute values from web search results. Typically the web search results are returned in response to a search request submitted by a user to a web search engine 104. The search request includes some type of search criteria selected by the user to enable the web search engine 104 to find desired results. The search criteria are typically input using some type of user interface, such as a keyboard, mouse, touch screen, etc. The search criteria may be in various formats, such as a natural language format, Boolean logic, information in a pre-defined form, and the like. The web search engine 104 may be configured to search one or more computer networks 108, such as the internet, a company LAN, etc. Examples of web search engines 104 are Google®, Bing®, Yahoo!®, etc. A web search engine 104 may include a proprietary search tool that includes logical search rules, form-based search tools, etc. A web search engine 104 may be any search tool that returns search results based on search criteria input by a user. The user may be a person or may be an application or computer program initiating a search.

The web search results returned by the web search engine 104 include data extracted from web pages searched by the web search engine 104 and also meeting the search criteria. Typically, the web search results are organized into a results list where data from a web page is grouped as an entry in the results list. The data for a particular web page may include a link to the web page, may include files, pictures, etc. Typically an entry in the results list is grouped in such a way that a user may be able to distinguish data from a first web page from data from another web page.

Along with links, pictures, files, etc. that are displayed to a user in the results list, typically data from a web page includes metadata attributes and associated attribute values. The metadata attributes and associated attribute values are extracted from the data of the results list by the metadata extraction module 202. A metadata attribute may be a category, grouping, etc. Some examples of metadata attributes are file size, file type, date created, owner, author, comments, date information, artist, bit rate, protection status, camera model, or any other useful information.

Attribute values are typically information that fits into a metadata attribute. For example, under the "date created" metadata attribute, each entry in the results list that includes a creation date may include an attribute value that is a date in the metadata attribute "date created." An attribute value for the metadata attribute "date created" may be Jun. 7, 2011. In another example, for the metadata attribute "year," attribute values may be 2009, 2010, 2011, and 2012 as well as other years. Entries in the results list that include a year may be included in a group of entries with a metadata attribute of "year." In one embodiment, data from a webpage may include metadata in the form of a header for a file or metadata located in a specific location on the webpage. The metadata, in some embodiments, may be organized into a table or other data structure where a metadata attribute is associated with an attribute value for the webpage. One of skill in the art will recognize other metadata attributes, associated attribute values, and data structures for metadata associated with a webpage.

In one embodiment, the search filter apparatus 102 includes an attribute presentation module 204 that presents the extracted metadata attributes to the user for the user to select one or more metadata attributes. For example, the attribute presentation module 204 may present the user with a list, table, etc. of metadata attributes. The list of metadata attributes may be presented to the user based on a user selection of some type. For example, the user may set a preference that when web search results are presented, the metadata attribute list is presented along with the web search results. In another example, after web search results are displayed, the user may take some other action to have the metadata attributes displayed. In another embodiment, the web search engine 104 automatically displays the metadata attributes or may include a menu choice or button for the user to indicate that the metadata attributes are to be displayed. Other examples will be discussed in relation to FIG. 3.

In another embodiment, the search filter apparatus 102 includes a metadata attribute selection module 206 that receives input from the user indicating one or more selected metadata attributes. The user may select metadata attributes by double clicking, selecting an associated check box, typing the desired metadata attributes in a window, or the like. In addition, the attribute selection module 206 that receives input from the user indicating a position indication for each selected metadata attribute. Each position indication indicates where in a custom report that attribute values for each selected metadata attribute are to appear.

Figure 4A:
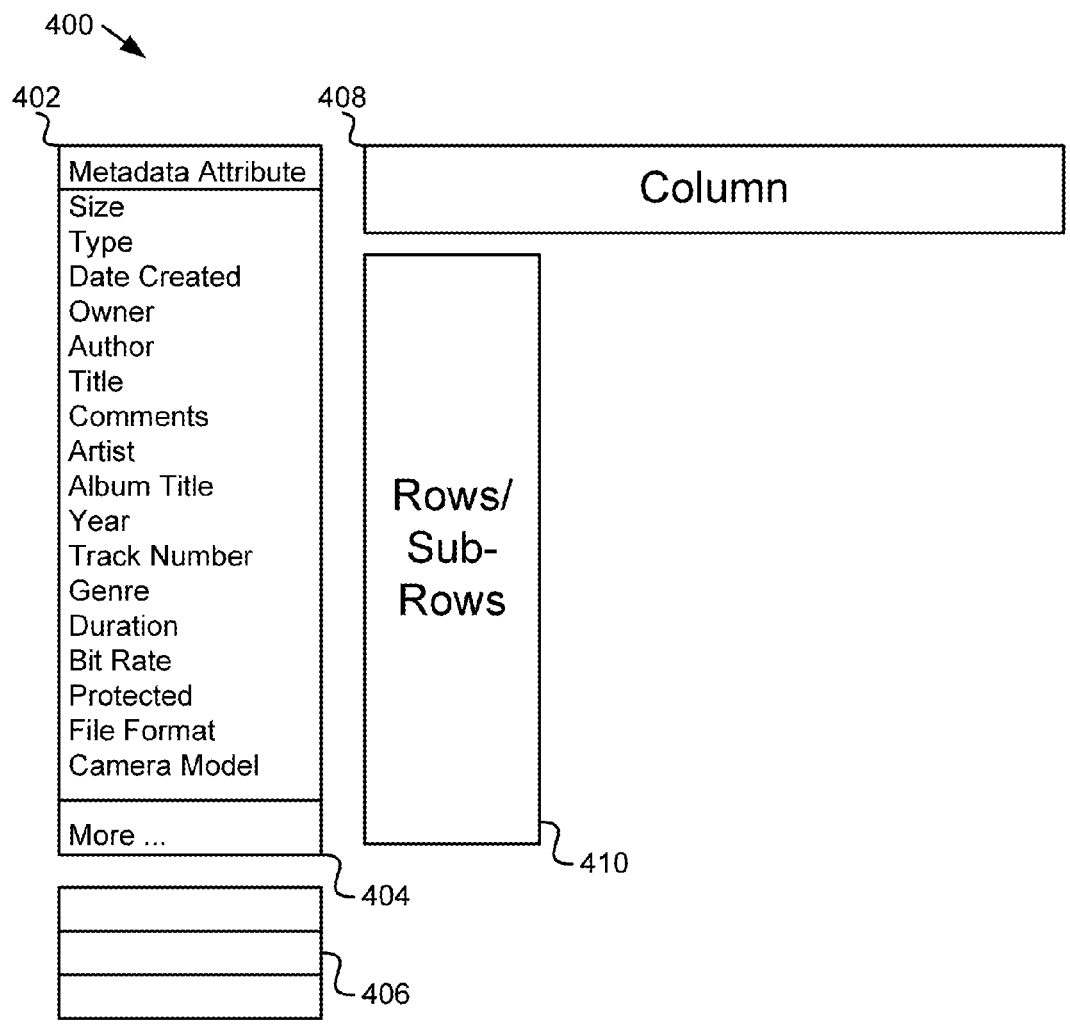
FIG. 4A is a schematic block diagram of a display of one embodiment of a form for creating a custom report using metadata attributes extracted from web search results.

For example, the user may indicate that attribute values for one selected metadata attribute are to be along a horizontal axis of the custom report while and that attribute values for another selected metadata attribute are to be along a vertical axis of the custom report. In another example, the user may indicate that attribute values for multiple metadata attributes are to appear in a horizontal axis or that attribute values for multiple metadata attributes are to appear in a vertical axis. The user may choose other position information to indicate where attribute values are to appear. FIGS. 4A and 4B described below show one particular example where a user has selected particular metadata attributes and has indicated where in a custom report the associated attribute values appear. One of skill in the art will recognize a wide variety of locations and formats that a user may choose to display attribute values.

In one embodiment, the search filter apparatus 102 includes a filter module 208 that filters the received results list based on the metadata attributes and associated attribute values. For example, the metadata attribute selection module 206 may have received two metadata attribute selections from the user and the attribute values for the first metadata attribute may be A1, A2, A3, . . . An, and the attribute values for the second metadata attribute may be B1, B2, B3, . . . Bn. The filter module 208 may then filter the web search results so in one embodiment filtered web search results may then include only data from web pages that include attribute values from the first metadata attribute and the second metadata attribute. The filter module 208 may further sort the filtered web search results so that one group of entries may include attribute values A1 and B1, another group of entries may include attribute values A1 and B2, another group of entries may include attribute values A1 and B3, and so on for each combination.

In another embodiment, the filter module 208 counts the number of entries in each group so that there is a number for the number of entries with attribute values A1 and B1, a number for the number of entries with attribute values A1 and B2, a number for the number of entries with attribute values A1 and B3, a number for the number of entries with attribute values A2 and B1, and so on until reaching the group of entries with attribute values An and Bn. Note that for a particular combination of attribute values (e.g. A3, B4) the number of entries may be zero.

In one embodiment, the search filter apparatus 102 includes a report display module 210 that displays the filtered results list to the user in a custom report. The custom report, in one embodiment, is arranged by the selected position indication for each selected metadata attribute. For the attribute values of a selected metadata attribute, the custom report is organized based on the position information chosen by the user for the selected metadata attribute. In one embodiment, for each display of an attribute value according to the selected position information, there is corresponding display of a quantity of entries from the results list associated with the attribute value. For example, if quantities of entries from the results list are displayed in a grid, attribute values for a selected first metadata attribute may be along a horizontal axis and attribute values for a selected second metadata attribute may be along a vertical axis. For a particular combination of attribute values (e.g. A1 on a horizontal axis and B4 on a vertical axis) a number may be displayed that is at an intersection of a vertical line from A1 and a horizontal line from B4. An example is described below in relation to FIGS. 4A and 4B.

In one embodiment, each displayed quantity of entries from the results list includes a link to entries that have attribute values associated with the display of the quantity of entries. For example, if a number "4" is displayed in conjunction with attribute values A3 and B2, the number "4" may be a link to four entries in the filtered web results that include attribute values A3 and B2. In other embodiments, a particular display of a quantity of entries may correspond to three or more attribute values from multiple metadata attributes. For example, the particular display of a quantity of entries may correspond to four attribute values, each from four separate selected metadata attributes. When the user selects the particular display of a quantity of entries, say for example the number 5, the five corresponding entries that have the four attribute values are displayed. One of skill in the art will recognize other ways for a user to position attribute values of metadata attributes so that the display module 210 displays corresponding quantities of entries of the filtered web results in a way that the user can recognize which quantities of entries correspond to particular attribute values.

In one embodiment, the report display module 210 displays links to filtered search results and the links are not in the form of quantities of entries. For example, the links may be symbols, letters, highlighted attribute values or other displayed items that indicate a connection to one or more attribute values of selected metadata attributes. The report display module 210 may display a custom report with any mechanism to indicate a division of entries of filtered web search results such that entries are divided to be associated with various attribute values of metadata attributes. A user may then select a particular division or link to display entries associated with particular attribute values of selected metadata attributes. One of skill in the art will recognize other ways for the report display module 210 to display a custom report so that a user may recognize entries in a filtered results list that are associated with particular attribute values of selected metadata attributes.

Figure 3:
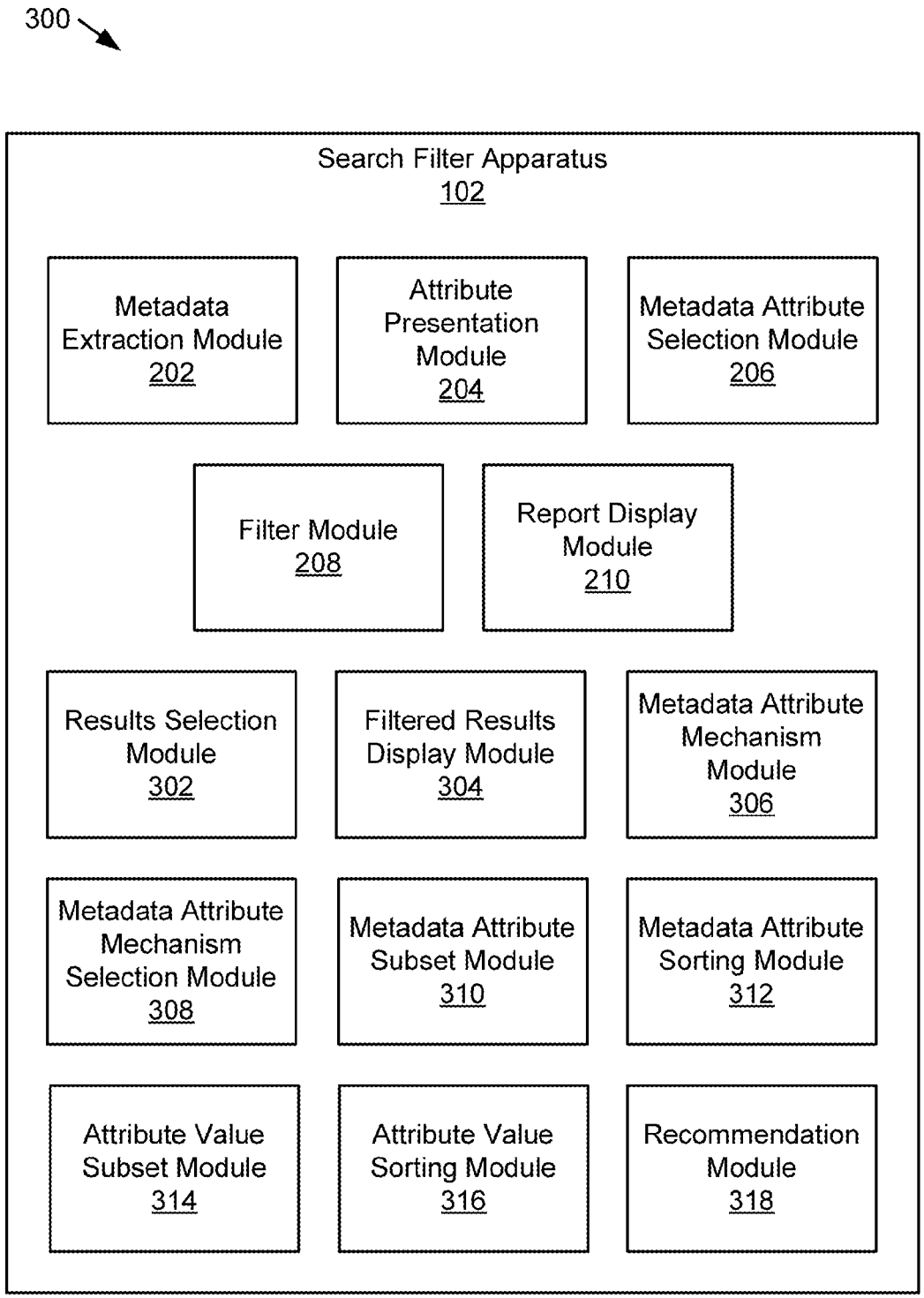
FIG. 3 is a schematic block diagram illustrating another embodiment of an apparatus for web searching in accordance with the present invention.

FIG. 3 is a schematic block diagram illustrating another embodiment of an apparatus 300 for web searching in accordance with the present invention. The apparatus 300 includes an embodiment of a search filter apparatus 102 with a metadata extraction module 202, an attribute presentation module 204, a metadata attribute selection module 206, a filter module 208, and a report display module 210, which are substantially similar to those described in relation to the apparatus 200 of FIG. 2. In addition, the embodiment of the search filter apparatus 102 may include one or more of a results selection module 302, a filtered results display module 304, a metadata attribute mechanism module 306, a metadata attribute mechanism selection module 308, a metadata attribute subset module 310, a metadata attribute sorting module 312, an attribute value subset module 314, an attribute value sorting module 316, and a recommendation module 318, which are described below.

In one embodiment, the search filter apparatus 102 includes a results selection module 302 that receives from the user a selection of a displayed quantity of entries and a filtered results display module 304 that displays entries associated with the selected quantity of entries. As mentioned above, the user may select a displayed quantity of entries in the custom report. The user may select the displayed quantity of entries, in one embodiment, by placing a cursor over the displayed quantity of entries and clicking a mouse button, clicking "enter" on a keyboard, etc. Any typical entry method for selecting an item in a display may be employed by the results selection module 302 to select a displayed quantity of entries.

The filtered results display module 304 typically displays entries from the results list that correspond to the displayed quantity of entries associated with one or more attribute values. For example, each entry may be grouped so that information about the web page associated with the entry is displayed. Each displayed entry includes, as metadata, attribute values associated with the displayed quantity of entries. For example, the entries include attribute values A1 and B3 if the displayed quantity of entries is situated in the custom report to be related to attribute values A1 and B3.

In another embodiment, the search filter apparatus 102 includes a metadata attribute mechanism module 306 that displays a metadata attribute selection mechanism in response to a display of entries of the results list. For example, if a web search engine 104 returns web search results in the form of a results list, the metadata attribute mechanism module 306 may display a metadata attribute selection mechanism along with the results list. For example, the metadata attribute selection mechanism may be a button, a menu item, a link, or other mechanism that enables a user to select the metadata attribute selection mechanism to enable selection of metadata attributes. The metadata attribute selection mechanism, in one embodiment, is part of the web search engine 104. In another embodiment, the metadata attribute selection mechanism is part of another application that runs in conjunction with the web search engine 104. The metadata attribute selection mechanism may be displayed automatically or by way of a preference by a user. One of skill in the art will recognize other ways that the metadata attribute selection mechanism is integrated with web search results and/or a web search engine 104.

In another embodiment, the search filter apparatus 102 includes a metadata attribute mechanism selection module 308 that receives from the user a selection of the metadata attribute selection mechanism. In one embodiment, presenting the extracted metadata attributes to the user occurs prior to receiving the selection of the metadata attribute selection mechanism from the user. For example, the extracted metadata attributes may be displayed after the user clicks a button, the button being the metadata attribute mechanism. The button may be labeled "Search Result Distribution," "Search Result Filter," or other appropriate label to alert the user of the functionality of the search filter apparatus 102.

In another embodiment, extraction of the metadata attributes and associated attribute values is in response to receiving the selection of the metadata attribute selection mechanism from the user. For example, the metadata extraction module 202 may wait to extract the metadata attributes until the metadata attribute mechanism selection module 308 receives selection of the metadata attribute selection mechanism from the user. In another embodiment, extraction of the metadata attributes and associated attribute values occurs independently from receiving the selection of the metadata attribute selection mechanism from the user. For example, the metadata extraction module 202 may extract metadata attributes from search results prior to display of the metadata attribute selection mechanism. One of skill in the art will recognize timing of execution of the metadata attribute mechanism module 306, the metadata attribute mechanism selection module 308, the metadata attribute extraction module 202 and the attribute presentation module 204.

In one embodiment, the search filter apparatus 102 includes a metadata attribute subset module 310 that presents a subset of metadata attributes to the user. In one embodiment, the subset includes metadata attributes occurring most often in the results list. For example, the web search results may include a large number of metadata attributes. Some the metadata attributes may correspond to a large number of entries in the results list while other metadata attributes may correspond to as few as a single entry in the results list. The number of metadata attributes may be more than can be displayed. The metadata attribute subset module 310, in various embodiments, displays a number of metadata attributes that can fit on a screen, a fixed number of metadata attributes, metadata attributes that correspond to a certain number of entries in the results list with an attribute value of the metadata attribute, or the like. In one embodiment, metadata attribute subset module 310 displays a subset of metadata attributes along with a mechanism for displaying more metadata attribute values, for example by way of a scroll bar, down arrow, etc.

In another embodiment, the search filter apparatus 102 includes a metadata attribute sorting module 312 that sorts the extracted metadata attributes. For example, the metadata attribute sorting module 312 may sort the extracted metadata attributes to be organized by number of times attribute values of each metadata attribute occurs in the results list. The attribute presentation module 204 may display metadata attributes organized so a metadata attribute with a largest number of attribute value occurrences is displayed first in the display of metadata attributes to the user. In addition, the metadata attribute subset module 310 may display a subset of the ordered metadata attributes and may display metadata attributes starting with the largest number of attribute value occurrences or, in another example, a smallest number of attribute value occurrences. In another embodiment, the metadata attribute sorting module 312 sorts metadata attributes alphabetically. One of skill in the art will recognize other ways for the attribute presentation module 204, the metadata attribute subset module 310, and the metadata attribute sorting module 312 to sort and display all or a subset of extracted metadata values.

In one embodiment, the search filter apparatus 102 includes an attribute value subset module 314 that displays, in the custom report, a subset of attribute values associated with a selected metadata attribute. As with metadata attributes, there may be a large number of attribute values associated with a selected metadata attribute so the attribute value subset module 314 may display a subset of the attribute values in the custom report. In another embodiment, the attribute value subset module 314 may include a mechanism for a user to select which attribute values of a selected metadata attribute are to be included in the custom report. For example, the attribute value subset module 314 may display all or a subset of the attribute values of a selected metadata attribute with a checkbox by each attribute value so the user may check the attribute values to be in the custom report.

In another embodiment, the search filter apparatus 102 includes an attribute value sorting module 316 that organizes attribute values of a selected metadata attribute by number of occurrences. For example, for a particular selected metadata attribute includes three attribute values, A1, A2, and A3, and A1 occurs 25 times in the filtered results list, A2 occurs 35 times, and A3 occurs 21 times, the attribute value sorting module 316 would sort the attribute values as follows: A2, A1, A3. In one embodiment, the report display module 210 displays the attribute values of a selected metadata attribute so an attribute value with a largest number of occurrences is displayed first in the display of attribute values. Further, the attribute value subset module 314 displays a subset of the attribute values with a largest number of occurrences is displayed first in the display of attribute values.

In another embodiment, as described above for the metadata attribute subset module 310, the attribute value subset module 314 may include a mechanism to display other subsets of attribute values, such as a scroll bar, arrow, etc. In other embodiments, the attribute value sorting module 316 that organizes attribute values of a selected metadata attributes in alphabetic order, numeric order, etc. One of skill in the art will recognize other ways that the report display module 210, the attribute value subset module 314, and the attribute value sorting module 316 may function to allow a user to customize the attribute values of the custom report.

In one embodiment, the search filter apparatus 102 includes a recommendation module 318 that adds a recommendation to a quantity of entries from the results list, an attribute value, and/or a metadata attribute. The recommendation a word or words, a symbol, etc. that a user recognizes as recommendation. For example, the recommendation may be a thumbs-up symbol that has wide acceptance that the user likes or approves of some aspect of the search results. In one embodiment, the recommendation appears in later web search results in response to a future web search. For example, if a user likes search results associated with the attribute values of the year 2011, in the Blues genre, and of a particular blues artist (i.e. A6"), the user may add a recommendation to web search results that include attribute values 2011, blues, and A6. (See FIG. 4B for a display of this example.) In a later search by the user or another user, search results with the attribute values 2011, blues, and A6 will include the recommendation.

In various embodiments, the recommendation may take the form of a thumbs-up symbol, a star, a smiley face, the word "like," or any other symbol, word, or group of words that conveys a message that the user recommends the search results, metadata attribute, attribute value, etc. In another embodiment, the recommendation may be used by the user to keep track of or mark search results for the user. In another embodiment, the user may select and copy a link to recommended search results or attribute values so that the user may reproduce the recommended search results. The recommendation and/or an associated link may be used in social networking, in searches by others, or in any other way that allows the user to express approval of particular search results, an attribute value, a metadata attribute, etc. One of skill in the art will recognize other ways to add a recommendation to search results, a display of a quantity of search results, an attribute value, a metadata attribute, etc.

FIG. 4A is a schematic block diagram of a display 400 of one embodiment of a form for creating a custom report using metadata attributes extracted from web search results. The display 400 includes a list 402 of metadata attributes, such as size, type, etc. The displayed metadata attributes are metadata attributes extracted by the metadata extraction module 202 from web search results. In the display 400, the list 402 of displayed metadata attributes is a subset of extracted metadata attributes selected by the metadata attribute subset module 310 and a mechanism 404 in the form of a button with a label of "more . . . " is included so a user may select the button to display additional extracted metadata values. In one embodiment, the attribute presentation module 204 displays the metadata attributes in a list 404 as shown. In another embodiment, the display 400 includes one or more boxes 406 for the user to create custom categories. The categories may be used to display other metadata, may be used to group or combine metadata attributes or attribute values, may include labels, or the like.

The display 400 may also include an area for column headers 408 and an area for row and sub-row headers 410. The areas for headers 408, 410 may be highlighted in some way, such as a box as shown or may be implied. In one embodiment, the user may drag one or more metadata attributes to the column and row header areas 408, 410 and the metadata attribute selection module 206 may recognize the action of the user as selecting metadata attributes and indicating position for the selected metadata attributes. In other embodiments, the user may select metadata attributes by checking a box, typing the metadata attributes, etc. and may indicate position information by typing the information, selecting position related items in a menu, etc. One of skill in the art will recognize other ways that a user may select metadata attributes and indicate position information about where attribute values of selected metadata attributes are to appear in a custom report.

FIG. 4B is a schematic block diagram of a display 401 of one embodiment of a custom report using selected metadata attributes and associated attribute values extracted from web search results. In one embodiment, the display 401 includes the list 402 of metadata attributes, the mechanism 404 to display additional metadata attributes, and the boxes 406 for the user to create custom categories, as in the display 400 of FIG. 4A. In the display 401 of FIG. 4B, the list 402 of metadata attributes includes an indication of selected metadata attributes (i.e. artist, year, genre). In another embodiment, one or more of list 402 of metadata attributes, the mechanism 404 to display additional metadata attributes, and the boxes 406 for the user to create custom categories are not displayed once the user has selected metadata attributes and indicated position information for the selected metadata attributes.

The display 401 also includes selected metadata attributes (year, artist, and genre) in a table 412. The table 412 includes a column header 408 with the "year" metadata attribute 409 and row and sub-row headers 410 with the "artist" and "genre" metadata attributes 411. The table 412 also includes attribute values 414 of the column metadata attribute 408 and row attribute values 416 and sub-row attribute values 418 of the row/sub-row metadata attributes 410. In the display 401, the attribute values 414 of the column metadata attribute 409 "year" include the years 2007 to 2012 as headers for multiple columns. The row attribute values 416 of the row metadata attribute 411 "genre" include the attribute values of R&B, blues, hip-hop, and classical. The sub-row attribute values 418 of the sub-row metadata attribute 411 "artist" include attribute values A1 to A11, which are meant to represent names or another identifier of an artist. In another embodiment, columns may be divided by column and sub-column similar to the rows and sub-rows of the display 401. One of skill in the art will recognize other ways to display attribute values of multiple selected metadata attributes.

The display 401 also includes quantities of entries 420 from the results list organized to indicate which attribute values 416, 418 are included in a particular quantity of entries 420. For example, for the "year" column attribute value 414 of "2009" in the "genre" row attribute value 416 of "classical" and the "artist" sub-row attribute value 418 of "A11," a quantity of entries 420 of "7" is displayed. This particular quantity of entries 420 aligns with the 2009 attribute value 414 and the A11 attribute value 418 in a "classical" attribute value 416 sub-row. In one embodiment, the quantity of entries 420 "7" includes a link to seven entries in the results list that contain a metadata attribute "year" with an attribute value of "2009," a metadata attribute "genre" with an attribute value of "classical," and a metadata attribute "artist" with an attribute value of "A11." In one embodiment, the filtered results display module 304 displays the seven entries in the results list with the "2009," "classical," and "A11" attribute values after the results selection module 302 receives from the user a selection of the "7" in the displayed quantity of entries 420. In one embodiment, the display 401 includes scroll bars (not shown) to view additional attribute values 414, 416, 418 and quantities of entries 420. One of skill in the art will recognize other custom report formats to display quantities of entries 420 corresponding with attribute values of selected, extracted metadata attributes 409, 411. In other embodiments (not shown), the quantities of entries 420 are replaced with other symbols, letters, etc. that may link to entries in a filtered results list associated with particular attribute values of selected metadata attributes.

In one embodiment, a user may add a recommendation to search results. For example, if a user likes search results that are of the year 2011 attribute value 414, the blues genre 411, and of the artist A6, the user may add a recommendation 422, which is displayed in one embodiment as a star. In another embodiment, if the user may recommend the R&B attribute value 416 of the Genre metadata attribute 411 and add a recommendation symbol 424. The user may also add a recommendation symbol 426 to a metadata attribute 411, such as "Genre." One of skill in the art will recognize other ways to add a recommendation to search results and/or to a custom report.

Figure 5:
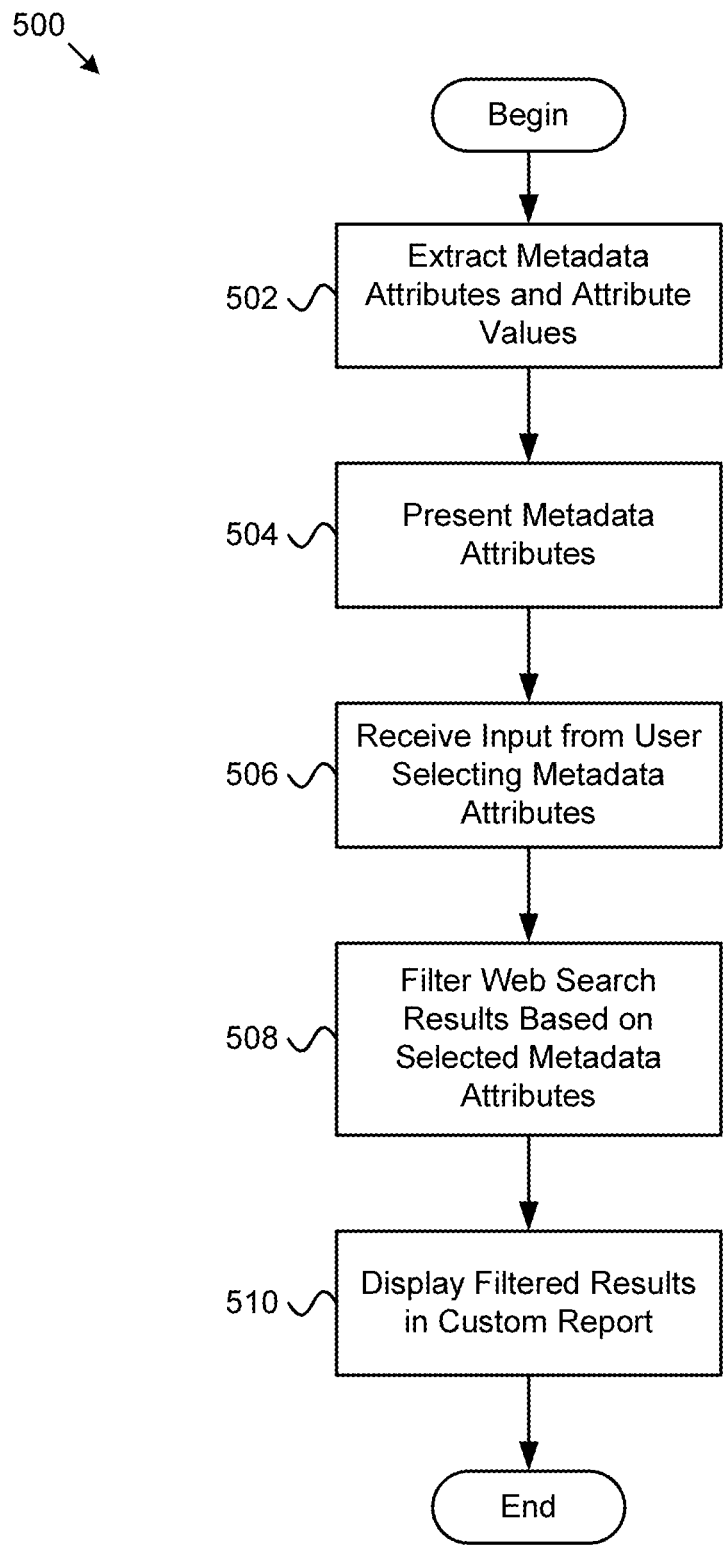
FIG. 5 is a schematic flow chart diagram illustrating one embodiment of a method for web searching in accordance with the present invention.

FIG. 5 is a schematic flow chart diagram illustrating one embodiment of a method 500 for web searching in accordance with the present invention. The method 500 begins and extracts 502 metadata attributes and associated attribute values from web search results, which may be organized in a results list. In one embodiment, the metadata extraction module 202 extracts the metadata attributes and the associated attribute values from the web search results. The method 500 presents 504 the metadata attributes 402 to the user for the user to select metadata attributes 402. The attribute presentation module 204, in one embodiment, presents the metadata attributes 402 to the user, possibly in the form of a list 402. The method 500 receives 506 input from the user indicating one or more selected metadata attributes 409, 411 and a position indication for each selected metadata attribute 409, 411. For example, the metadata attribute selection module 206 may receive the metadata attribute selection information and the position information from the user.

The method 500 filters 508 the results list of the web search results based on the selected metadata attributes 409, 411 to provide a filtered results list that includes attribute values 414, 416, 418 of the selected metadata attributes. In one embodiment, the filter module 208 filters the web search results. The method 500 displays 510 the filtered results list to the user in a custom report, in one embodiment, by displaying quantities of entries 420 associated with the attribute values 414, 416, 418 such that the user may select a particular quantity of entries 420 to display the entries in the filtered results list that include the associated attribute values 414, 416, 418, and the method 500 ends. In one embodiment, the report display module 210 displays the filtered results list to the user in a custom report. In another embodiment, the method 500 displays 510 links to the user where the links are symbols, letters, characters, etc. and each is associated with one or more particular attribute values of selected metadata attributes.

Figure 6:
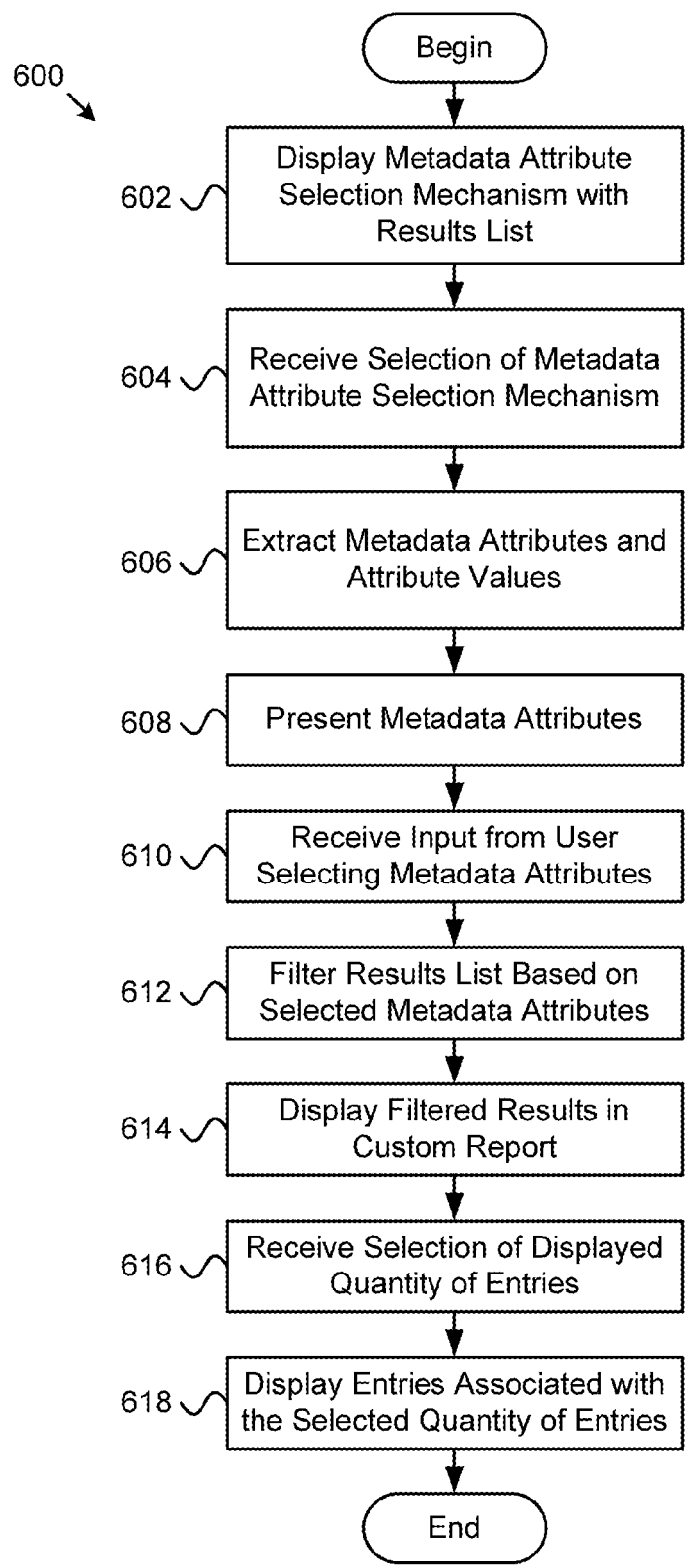
FIG. 6 is a schematic flow chart diagram illustrating another embodiment of a method for web searching in accordance with the present invention.

FIG. 6 is a schematic flow chart diagram illustrating another embodiment of a method 600 for web searching in accordance with the present invention. The method 600 begins and displays 602 a metadata attribute selection mechanism along with a results list from web search results. In one embodiment the metadata attribute mechanism module 306 includes displays 602 the metadata attribute selection mechanism. In other embodiments, the metadata attribute selection mechanism is displayed 602 in response to user input, such as selecting an item from a menu. The method 600 receives 604 a selection of the metadata attribute selection mechanism and extracts 606 metadata attributes and associated attribute values from web search results. The metadata attribute mechanism selection module 308, in one embodiment, receives 604 the selection of the metadata attribute selection mechanism. In another embodiment, the metadata extraction module 202 extracts 606 the metadata attributes and associated attribute values from the web search results.

The method 600 presents 608 the metadata attributes 402 to the user for the user to select metadata attributes 402, for example using the attribute presentation module 204, possibly in the form of a list 402. The method 600 receives 610 input from the user indicating one or more selected metadata attributes 409, 411 and a position indication for each selected metadata attribute 409, 411, for example using the metadata attribute selection module 206. The method 600 filters 612 the results list of the web search results based on the selected metadata attributes 409, 411 to provide a filtered results list that includes attribute values 414, 416, 418 of the selected metadata attributes. The filter module 208 may be used to filter the results list.

The method 600 displays 614 the filtered results list to the user in a custom report by displaying quantities of entries 420 associated with the attribute values 414, 416, 418. In one embodiment, the quantities of entries 420 are links. The user may select a particular quantity of entries 420 and the method 600 receives 616 the user's selection of a quantity of entries and displays 618 to the user the entries in the filtered results list that include the associated attribute values 414, 416, 418, and the method 600 ends. In various embodiments, the report display module 210 may display 614 the filtered results list to the user, the results selection module 302 may receive 616 the user's selection of a quantity of entries, and the filtered results display module 304 may display the filtered results list.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
extracting metadata attributes and associated attribute values from web search results, the web search results returned in response to a search request submitted by a user to a web search engine, the search request comprising search criteria, the web search results comprising data extracted from web pages searched by the web search engine and meeting the search criteria, the web search results organized into a results list where data from a web page is grouped as an entry in the results list, the metadata attributes and associated attribute values extracted from the data of the results list;
presenting the extracted metadata attributes to the user for the user to select one or more metadata attributes;
receiving input from the user indicating one or more selected metadata attributes and a position indication for each selected metadata attribute, each position indication indicating where in a custom report that attribute values for each selected metadata attribute are to appear;
filtering the received results list based on the selected metadata attributes and associated attribute values; and
displaying the filtered results list to the user in a custom report, the custom report arranged by the selected position indication for each selected metadata attribute, wherein for an attribute value of a selected metadata attribute, the custom report is organized based on the position information of the selected metadata attribute to display the attribute value, according to the position information, along with a display of a quantity of entries from the results list associated with the attribute value, wherein the position information received from the user is chosen so each display of a quantity of entries is associated with at least one attribute value from two or more selected metadata attributes, wherein each displayed quantity of entries is linked to entries from the results list that include two or more attribute values from one or more metadata attributes, wherein a plurality of quantities of entries are displayed in a table and selected position information for a first selected metadata attribute comprises displaying associated attribute values along a first axis of the table and selected position information for a second selected metadata attribute comprises displaying associated attribute values along a second axis of the table, wherein quantity entries aligning with a first attribute value of the first selected metadata attribute and with a first attribute value of the second selected metadata attribute include entries with both the first attribute value of the first selected metadata attribute and with the first attribute value of the second selected metadata attribute.

2. The method of claim 1, wherein each indication of a quantity of entries from the results list comprises a link to entries that have the attribute value associated with the display of the quantity of entries.

3. The method of claim 1, wherein each displayed quantity of entries is linked to entries from the results list that include attributes values from two or more metadata attributes and each displayed quantity of entries is organized so it is apparent that a display of the included attribute values from the two or more metadata attributes are associated with the displayed quantity of entries.

4. The method of claim 1, further comprising:
receiving from the user a selection of a displayed quantity of entries; and
displaying entries associated with the selected quantity of entries.

5. The method of claim 1, further comprising:
displaying a metadata attribute selection mechanism in response to a display of entries of the results list; and
receiving from the user a selection of the metadata attribute selection mechanism, wherein extraction of the metadata attributes and associated attribute values is in response to receiving the selection of the metadata attribute selection mechanism from the user.

6. The method of claim 1, wherein the web search results comprise first web search results and further comprising adding a recommendation to one or more of a quantity of entries from the results list, an attribute value, and a metadata attribute, the recommendation comprising one or more of words and a symbol that a user recognizes as recommendation, the recommendation appearing in second web search results in response to a second web search.

7. The method of claim 1, wherein the results list comprises links to web pages meeting the search criteria, each web page comprising one or more of informational web pages, videos, pictures, video games, and music.

8. The method of claim 1, wherein presenting the metadata attributes to the user for the user to select a plurality of metadata attributes further comprises presenting a subset of metadata attributes to the user.

9. The method of claim 8, wherein the subset of metadata attributes displayed to the user are organized by number of times attribute values of each metadata attribute occurs in the results list and are organized so a metadata attribute with a largest number of attribute value occurrences is displayed first in the display of metadata attributes to the user.

10. The method of claim 1, wherein for each selected metadata attribute, displaying the filtered results list to the user in a custom report further comprises displaying, for a selected metadata attribute, a subset of associated attribute values along with a display of associated quantities of entries from the results list.

11. The method of claim 10, wherein the subset of attribute values displayed to the user are organized by number of occurrences of attribute values and are organized so an attribute value with a largest number of occurrences is displayed first in the display of attribute values.

12. An apparatus comprising:
a metadata extraction module that extracts metadata attributes and associated attribute values from web search results, the web search results returned in response to a search request submitted by a user to a web search engine, the search request comprising search criteria, the web search results comprising data extracted from web pages searched by the web search engine and meeting the search criteria, the web search results organized into a results list where data from a web page is grouped as an entry in the results list, the metadata attributes and associated attribute values extracted from the data of the results list;
an attribute presentation module that presents the metadata attributes to the user for the user to select one or more metadata attributes;
a metadata attribute selection module that receives input from the user indicating one or more selected metadata attributes and a position indication for each selected metadata attribute, each position indication indicating where in a custom report that attribute values for each selected metadata attribute are to appear;
a filter module that filters the received results list based on the selected metadata attributes and associated attribute values; and
a report display module that displays the filtered results list to the user in a custom report, the custom report arranged by the selected position indication for each selected metadata attribute, wherein for an attribute value of a selected metadata attribute, the custom report is organized based on the position information of the selected metadata attribute to display the attribute value, according to the position information, along with a display of a quantity of entries from the results list associated with the attribute value, wherein the position information received from the user is chosen so each display of a quantity of entries is associated with at least one attribute value from two or more selected metadata attributes, wherein each displayed quantity of entries is linked to entries from the results list that include two or more attribute values from one or more metadata attributes, wherein a plurality of quantities of entries are displayed in a table and selected position information for a first selected metadata attribute comprises displaying associated attribute values along a first axis of the table and selected position information for a second selected metadata attribute comprises displaying associated attribute values along a second axis of the table, wherein quantity entries aligning with a first attribute value of the first selected metadata attribute and with a first attribute value of the second selected metadata attribute include entries with both the first attribute value of the first selected metadata attribute and with the first attribute value of the second selected metadata attribute,
wherein at least a portion of the metadata extraction module, the attribute presentation module, the metadata attribute selection module, the filter module, and the report display module comprise one or more of logic hardware and computer readable program code, the computer readable program code stored on non-transitory computer readable storage media.

13. The apparatus of claim 12, further comprising:
a results selection module that receives from the user a selection of a displayed quantity of entries; and
a filtered results display module that displays entries associated with the selected quantity of entries.

14. The apparatus of claim 12, further comprising:
a metadata attribute mechanism module that displays a metadata attribute selection mechanism in response to a display of entries of the results list; and
a metadata attribute mechanism selection module that receives from the user a selection of the metadata attribute selection mechanism, wherein presenting the extracted metadata attributes to the user occurs prior to receiving the selection of the metadata attribute selection mechanism from the user.

15. The apparatus of claim 12, further comprising a server, the server executing the apparatus.

16. A computer program product for filtering search results, the computer program product comprising a non-transitory computer readable storage medium having computer readable program code embodied therewith, the computer readable program code comprising computer readable program code configured for:
extracting metadata attributes and associated attribute values from web search results, the web search results returned in response to a search request submitted by a user to a web search engine, the search request comprising search criteria, the web search results comprising data extracted from web pages searched by the web search engine and meeting the search criteria, the web search results organized into a results list where data from a web page is grouped as an entry in the results list, the metadata attributes and associated attribute values extracted from the data of the results list;
presenting the metadata attributes to the user for the user to select one or more metadata attributes;
receiving input from the user indicating one or more selected metadata attributes and a position indication for each selected metadata attribute, each position indication indicating where in a custom report that attribute values for each selected metadata attribute are to appear;
filtering the received results list based on the selected metadata attributes and associated attribute values; and displaying the filtered results list to the user in a custom report, the custom report arranged by the selected position indication for each selected metadata attribute, wherein for an attribute value of a selected metadata attribute, the custom report is organized based on the position information of the selected metadata attribute to display the attribute value, according to the position information, along with a display of a quantity of entries from the results list associated with the attribute value, wherein each indication of a quantity of entries from the results list comprises a link to entries that have the attribute value associated with the display of the quantity of entries and wherein the position information received from the user is chosen so each display of a quantity of entries is associated with at least one attribute value from two or more selected metadata attributes, wherein each displayed quantity of entries is linked to entries from the results list that include two or more attribute values from one or more metadata attributes, wherein a plurality of quantities of entries are displayed in a table and selected position information for a first selected metadata attribute comprises displaying associated attribute values along a first axis of the table and selected position information for a second selected metadata attribute comprises displaying associated attribute values along a second axis of the table, wherein quantity entries aligning with a first attribute value of the first selected metadata attribute and with a first attribute value of the second selected metadata attribute include entries with both the first attribute value of the first selected metadata attribute and with the first attribute value of the second selected metadata attribute.

17. The computer program product of claim 16, wherein the position information received from the user is chosen so each display of a quantity of entries is associated with at least one attribute value from two or more selected metadata attributes.

* * * * *